(12) United States Patent
Ollar

(10) Patent No.: US 6,601,800 B2
(45) Date of Patent: Aug. 5, 2003

(54) AERIAL REFUELING POD AND CONSTANT TENSION LINE APPARATUS

(76) Inventor: Charles Howard Ollar, 3308 Oak Grove #200, Dallas, TX (US) 75204

( * ) Notice: Subject to any disclaimer, the term of this patent is extended or adjusted under 35 U.S.C. 154(b) by 0 days.

(21) Appl. No.: 09/953,680

(22) Filed: Sep. 17, 2001

(65) Prior Publication Data

US 2002/0074455 A1 Jun. 20, 2002

Related U.S. Application Data

(60) Provisional application No. 60/233,762, filed on Sep. 19, 2000.

(51) Int. Cl.[7] .............................................. B64D 39/00
(52) U.S. Cl. .................................................. 244/135 A
(58) Field of Search ......................... 244/135 A, 135 R, 244/135 B, 136, 1 TD

(56) References Cited

U.S. PATENT DOCUMENTS

| | | | | |
|---|---|---|---|---|
| 3,674,049 A | * | 7/1972 | Macgregor | 137/355.2 |
| 5,141,178 A | * | 8/1992 | Alden et al. | 242/483 |
| 5,326,052 A | * | 7/1994 | Krispin et al. | 244/135 A |
| 5,427,333 A | * | 6/1995 | Kirkland | 244/135 A |
| 5,573,206 A | * | 11/1996 | Ward | 244/1 TD |
| 5,921,294 A | * | 7/1999 | Greenhalgh et al. | 137/899.2 |

OTHER PUBLICATIONS

Document AU/ACSC/0412/97–03, "Running on empty:The development of helicpter aerial refueling and implications for future USAF combat rescue capabilities" by Major Tracy W. Colburn, Mar. 1997, 38 pages.

* cited by examiner

*Primary Examiner*—Robert P. Swiatek
(74) *Attorney, Agent, or Firm*—Gordon & Jacobson, P.C.

(57) ABSTRACT

An aerial refueling pod and constant tension line apparatus.

2 Claims, 4 Drawing Sheets

AERIAL REFUELING POD AND CONSTANT TENSION LINE APPARATUS

This application claims the benefit of U.S. Provisional Application No. 60/233,762, filed Sep. 19, 2000.

FIELD OF THE INVENTION

This Invention relates to removably mounted, portable, aircraft-based wing or fuselage mounted, integrated pod stores and constant tension line conditioners, for air to air refueling systems, and submarine or ship based towed arrays, refueling lines or other towed decoy assemblies.

BACKGROUND OF THE INVENTION

Fixed wing aircraft typical of the Boeing 707 aircraft employed by the Canadian Armed Forces, or Brazilian Air Force, or the Lockheed-Martin MC-130 employed by the U.S. Air Force, for the purpose of undertaking aerial refueling missions have typically used axial arrayed hose and drum reel configurations typical of the MK 32 refueling pod manufactured by the Sargent Fletcher Corporation of California, which depend on a hydraulic drive system to extend and retract the refueling hose and drogue assembly. This hydraulic methodology has been cited by the U.S. Air Force in document HQ ACC/DRS, 17–20 as "unreliable", and further the entire FR-300 pod system was noted as having a Mean Time Before Failure (MTBF) of only 49 hours, in U.S. Air Force document HQ ACC/DRS, 19.

Further in the white paper published by Major Tracy W. Colburn in March of 1997, entitled "Running On Empty: The Development Of Helicopter Aerial refueling And Implications For Future USAF Combat Rescue Capabilities", prepared for the U.S. Air Force Air Command And Staff College, document reference AI/ACSC/0412/97-03, Major Tracy cited several instances where helicopter rescue, and training missions were compromised because of inoperable refueling equipment.

In the area of aerodynamics existing refueling pods are also larger, primarily due to the drum reel assemblies they must incorporate within the pod housing, thereby possessing greater weight and wetted surface area, and inducing greater drag. Also the configuration of the existing MK-32 pod results in the creation of a large orifice on the underside of the pod which projects aft towards the rear of the pod with resulting localized adverse aerodynamic turbulence. Even the Flight Refueling MK-32B75 pod with its reduced cross section and superior aerodynamics over the FR-300 pod suffers from mechanical tension retraction and drum type reel systems which are more prone to failure resulting in a lower MTBF.

Further, problems also exist in the limited length of the hose which can be carried in existing aerial refueling pods without adding to the aforementioned, configuration, aerodynamic, and associated drag problems. Short hoses inhibit the range of the receiving aircraft relative to the fuel delivery aircraft, as strong vortices exist in localized turbulence pockets thereby restricting the speed, position, or simultaneous refueling of two aircraft by a single fuel delivery aircraft Shorter hose lengths of approximately 70 feet are now the normal length in use, and under various circumstances, and relative to new emerging refueling aircraft like the Boeing KS 767 existing pods and their reduced hose lengths, would be limiting, if not impossible to use.

Another area of design difficulty in aerial refueling, is when undergoing refueling, the fuel receiving aircraft equipped with male probe, will periodically charge or advance forward towards the fuel delivering aircraft equipped with the hose and rogue assembly, in a manner which is faster than the hose can be manually or mechanically retracted. When the line is left slack, considerable problems related to hose aerodynamics may result, making the hose unstable and potentially dangerous to the both the delivery and receiving aircraft.

Hence various mechanical methods constituting prior art, have been designed by Sargent Fletcher, and Flight Refueling Of England, which can sense the slack in the refueling hose when it is charged by the receiving aircraft, and retract the hose to maintain constant tension on the hose and drogue assembly. Existing refueling pods suffer a weight penalty, and higher incidence of equipment failure due to the tension retraction and other mechanical assemblies used to maintain a constant tension on the hose and drogue assembly by a receiving aircraft.

In other applications typical of tugboats, support vessels for tethered underwater Remotely Operated Vehicles (ROV's) or other surface combatant ships engaged in ship to ship refueling, mine sweeping, or anti-submarine warfare, the towing of barges, marine de-mining sled assemblies, or towed sonar arrays, particularly in rough seas, creates difficulties when one vessel is moving faster than the other, or closes the distance laterally to the other vessel, as in the case of ship to ship refueling, or are affected by large waves creating cyclic or periodic snap loading of the towing cable, refueling line, or support lines for support vessels and ROV's.

Currently, prior art, and practices for resolving the aforementioned aerial refueling, and marine based towing, support, or refueling, special mission work systems problems, are inadequate, unreliable, non existent, or expensive, resulting in decreased aircraft performance, decreased safety margins, unacceptable line, cable, or hose oscillation, unacceptable aerial refueling hose lengths, and otherwise inhibit mission readiness.

Accordingly there is a continuing unaddressed need for a lightweight, low profile, low aerodynamic drag, reliable refueling pod, with a simple lightweight methodology for stowing longer lengths of refueling hose, and a line, cable or hose constant tension system with few mechanical parts and a high degree of reliability.

BRIEF SUMMARY OF THE INVENTION

The present invention solves, the aforementioned problems associated with bulky, heavy, air refueling drum reel configurations with a block and tackle pulley arrangement to achieve less mass, which results in reduced pod cross section, reduced weight due to fewer mechanical components, reduced wetted surface area for cleaner, aerodynamics, and an aft located deployment aperture resulting in less drag and fewer vortices affecting the hose and drogue assembly.

The present invention also uses, a novel charged gas cylinder instead of mechanically actuated retraction means to maintain constant tension on the hose assembly when the drogue is pushed forward by the receiving aircraft. This same methodology for maintaining constant tension is also applicable to the ship or submarine based towing, ROV support, de-mining, and anti-submarine warfare towed sonar array application problems cited in the aforementioned "Background of the Invention" section material.

The preferred embodiment of the current invention solves the aforementioned dedicated weight, aerodynamic, reliability, constant tension, and other aforementioned issues by meeting the following objectives;

Objective One—Create a low profile, aerodynamically smooth aerial refueling pod.

Objective Two—Reduce the weight of existing pod based aerial refueling systems.

Objective Three—Reduce the number of components and Inherent mean time before failure (MTBF), in existing refueling pods by achieving a simple, yet redundant system of components.

Objective Four—Devise a method of carrying more hose length, without compromising the first three objectives.

Objective Five—Create a new reeling system, which will permit the achievement of objectives one, two, and three.

Objective Six—Create a simpler lighter, less bulky constant tension line or hose conditioning system which also facilitates "Objective One" and is universal enough in principle to address other terrestrial, or marine based applications for the resolution of snap loading issues.

The foregoing objectives are achieved by the preferred embodiment of the present invention which undertakes the integration of novel technologies, and assemblies, which would be recognized as enabling to those skilled in the art of air to air refueling, towed ECM decoys, towed targets, marine towing, or ROV support, without inducing weight, drag, size, reliability, or singular application penalties upon the user. The preceding six objectives, are achieved by the following three sets of components and assemblies;

1) a temporarily mounted, symmetrical, constant diameter, low profile aerial refueling pod equipped with female drogue, hose, and deployment, retraction assembly, and indicator lighting system, 2) a block and tackle reeling system arrayed longitudinally within the pod to provide more hose, with less cross section, and fewer parts, with less weight than conventional reeling systems, 3) A constant tension line conditioning system which uses a charged gas cylinder, instead of mechanical or electrical retraction and extension means.

The integration of the foregoing systems, embodied within one refueling pod or as separate components of the present Invention, achieve the foregoing objectives, and provide portability, and adaptability for use aboard multiple aircraft platforms.

DETAILED DESCRIPTION OF THE INVENTION

The invention is now described in terms of the FIGURES to more fully delineate in more detail the scope, materials, conditions, and methods of the present invention. Many of the parts and components of the present invention are hereinafter described as being "assemblies." As used herein, the word "assembly" or "assemblies" refers to the totality of related parts and pieces related to a given component and its operability, and is not to be considered as limiting to a particular part, piece, or operation.

Constant Tension System

In general, the invention comprises a novel design and integration approach in the configuration, capability, and operation of air to air refueling pods, and other missions or activities which depend on methodologies for mitigating snap loading, or relaxation on hoses, cables, or other towed assemblies in the aeronautical or marine environments.

Figure 1:
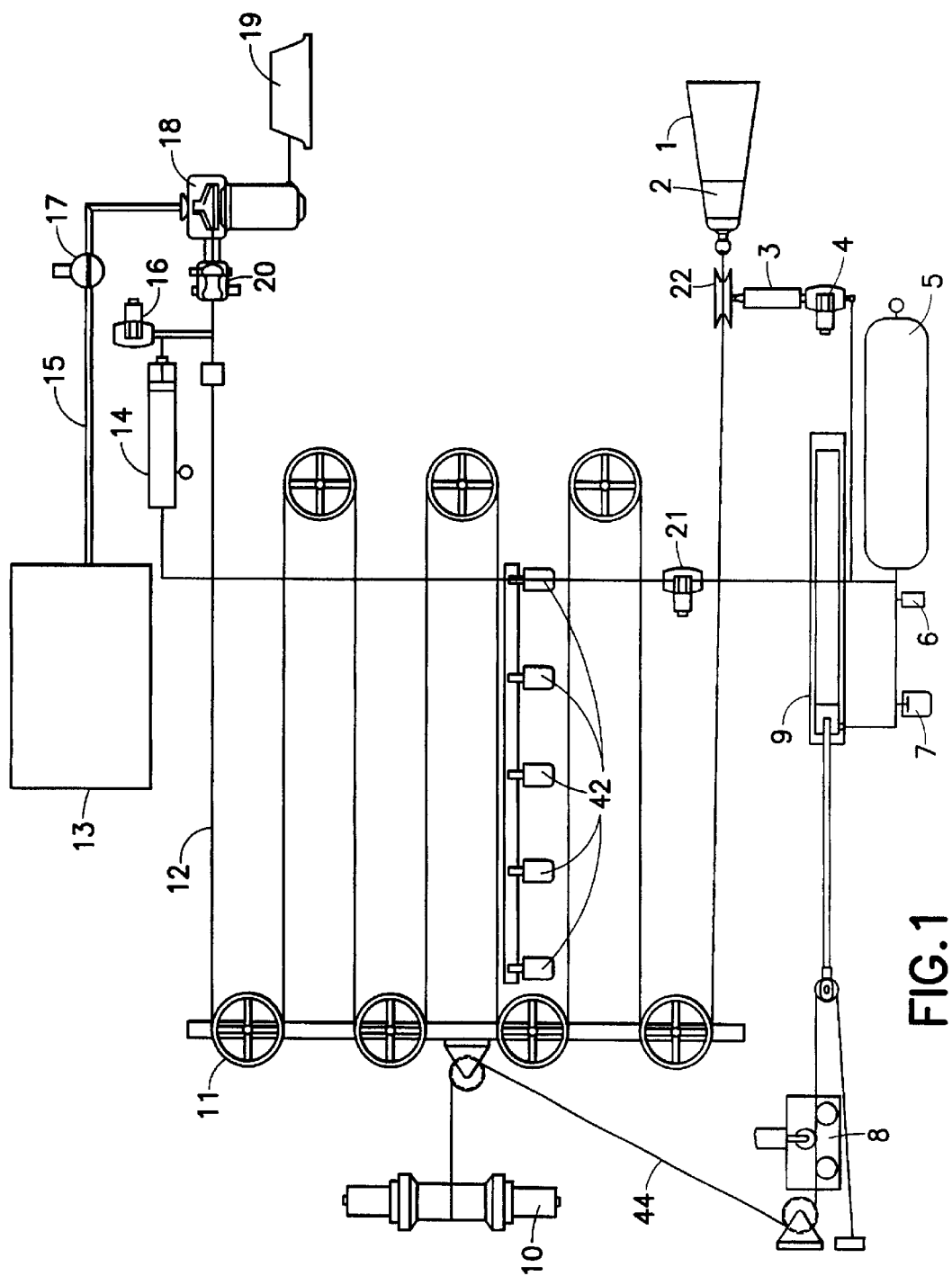
FIG. 1 Is a schematic detailing the individual items, and relationship of the various refueling hose, and tension restraint components, of the overall assembly of the present invention.
Figure 2:
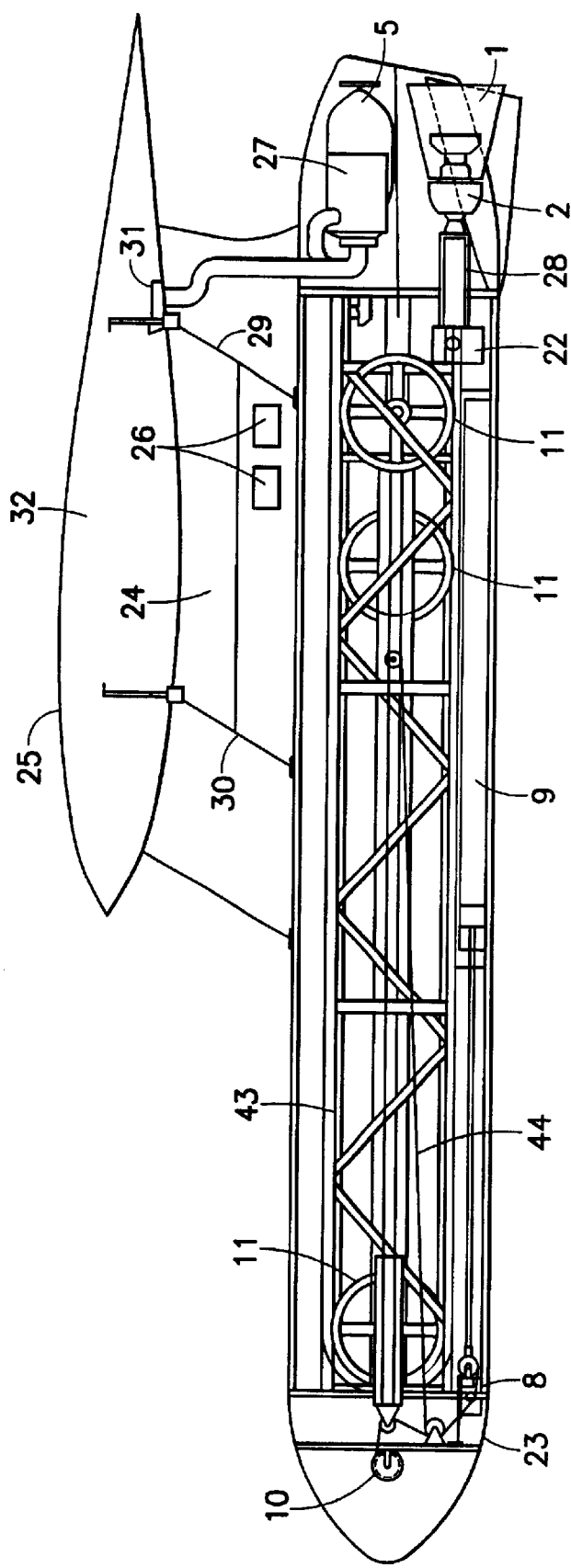
FIG. 2 Is a side view of the present refueling pod invention depicting the overall internal arrangement, and aerodynamic form of the present invention, as mounted on a wing pylon.

One such pod system architecture is depicted in FIGS. 1, and 2, wherein a Reel/Pulley 11, system is moveably attached to a Refueling Hose/Cable 12, which in aerial refueling applications is shrouded at the trailing end by a Drogue Extension Spring 28, and also provides an attachment interface for an MAX Coupling 2, and a further subsequent female refueling Drogue Assembly 1, attached to MA-4 Coupling 2. As force is applied by a receiving aircraft against said Refueling Hose/Cable 12, and Drogue Assembly 1, the Response Cylinder 9, exerts an autonomous, constant pulling force on the Extension Control Cable & Pulley Assembly 44, by means of a piston inside the Response Cylinder 9, which is activated downward along the length of the Response Cylinder 9, from pressurized nitrogen derived from the Nitrogen Accumulator/Vessel 5, which when activated by a Pressure Transducer 7, injects compressed nitrogen into the Pressurized Nitrogen Line 45, which activates the piston inside the Response Cylinder 9, and exerts a force. Which pulls the Extension Control Cable & Pulley Assembly 44. towards the Retraction Drive 10, which moves inside the Block & Tackle/Pulley/Travel Carriage 43, thereby matching the rate of slack imposed by the fuel receiving aircraft. The Slack Detector 8, senses changes in the condition of the Refueling Hose/Cable 12, and compensates for extremes which may occur thereby reporting positioning signals to the System Controller 19, which in turn can task said system components like the Relief Valve 8, to respond to more or less pressure in the system accordingly.

Said Pressure Transducer 7, being activated either before or after slack detection depending upon pressure requirements inside the Response Cylinder 9. When excess pressure is accumulating due to retraction of the piston inside the Response Cylinder 9, then the Relief Valve 6, opens to vent excess nitrogen to the ambient air outside when the hose, cable or other line is being spooled out, and conversely closes to allow pressurized nitrogen to flood the Response Cylinder 9, for example when accommodating for slack in the Refueling Hose/Cable 12, when a receiving aircraft moves forward when connected to the Drogue Assembly 1.

When the retraction of the line exceeds the reach of the piston arm inside the Response Cylinder 9, the Retraction Drive 10, is activated when the length of hose or cable is detected by a plurality of Position Switches 42, which relay a signal to the system Controller 19, which then correlates the spooled length of the Refueling Hose/Cable 12, and activates the Retraction Drive 10, before the forward surging aircraft or other surging medium, for example, an all stop command on a submarine or ship, or ocean waves, which can all effect the desired constant tension of the Refueling Hose/Cable 12. Said Retraction Drive 10, also being used manually by the system operator to retract, or extend the Refueling Hose/Cable 12, to a predetermined length, before the autonomous tension restraint system commences tasking over uncontrolled slackening of the Refueling Hose/Cable 12.

The preferred embodiment of the present invention also incorporates a compressed nitrogen Actuator 3, which is charged by the Nitrogen Accumulator/Vessel 5, which is connected to the Pressurized Nitrogen Line 45, system, and may as required by the system operator, be used to activate a Jettison Valve 4, which in turn releases the pressure rapidly as to cause a bladed Guillotine 22, mechanism to cut the Refueling Hose/Cable 12, and thereby prevent damage or loss of the host aircraft by an uncontrolled trailing fuel hose, Airborne Towed Decoy 46, target, ECM array, or other aeronautical or marine towed, or connecting line or hose assembly.

Fuel System

As depicted in FIG. 1, the preferred embodiment of the present invention also includes a fuel management system comprising Fuel Tank 13, or several interconnecting tanks as a fuel source, which Is connected by a Fuel Line 15, which is connected to a Surge Suppressor 14, which is pressure activated from the Nitrogen Accumulator/Vessel 5, and connected to same by the Pressurized Nitrogen Line 45, which is connected to a Pressure Regulator 21, which controls the nitrogen pressure to the Surge Suppressor 14, which works in conjunction with a Bleed Valve 16, which is connected with the Fuel Line 15, to prevent surging in the fuel supply.

The system operator is also equipped with a manual Aircraft Fuel Shut Off Valve 17, located within the, Host Refueling Aircraft 36, or attached to the pylon or pod casing for maintenance purposes. The primary means for pumping fuel is provided by a primary Fuel Pump 18, and augmented by a secondary Fuel Booster Pump 27, which in turn is turned on or off, and specific fuel flows regulated by a system Controller 19. A fuel Flow Meter 20, regulates and reports on the quantity of fuel being pumped, and also provides thermal relief.

Use & Mounting

Figure 3:
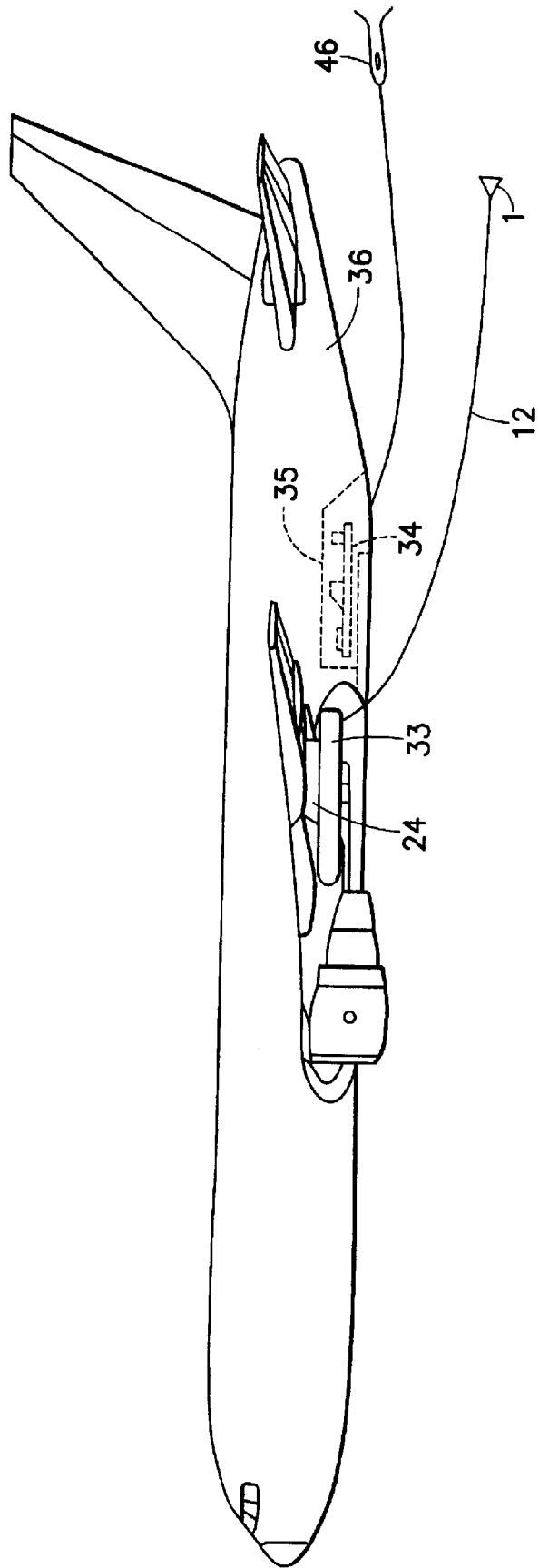
FIG. 3 Is a side view of a Boeing KC-767 depicting the refueling pod of the present invention mounted on the wing pylon, and further depicting the present invention installed within a pressure vessel inside the aircraft to undertake both wing and centerline refueling or decoy target towing, in simultaneous fashion.

As depicted in FIGS. 1, through 3, the preferred embodiment of the present invention also incorporates a low profile, aerodynamically dean Pod Casing 23, mounted on an aircraft Pylon 24, which is attached to an Aircraft Wing 25, or fuselage Pylon 24, attached to the Host Refueling Aircraft 36. Said Pylon typically being aerodynamically engineered in terms of shape, and consisting of an Aft Spar 29, and Forward Spar 30, to provide a structural interface for the fully integrated weight and aerodynamic forces exerted upon the populated Refueling Pod Assembly 33. Said Pylon 24, also providing access to Maintenance System Controls 26, used by ground personnel, and providing power, data, and fuel connectivity to an Aircraft Fuel Tank 31, located within an aircraft's fuselage, or a Wing Fuel Tank 32.

As depicted in FIG. 3, a Host Refueling Aircraft 36. May accommodate a fuselage mounted version of the present invention which incorporates an Internally Mounted Refueling/Cable Carriage Assembly 34, structurally mounted through a Pressure Housing 35, affixed to the Host Refueling Aircraft 36, and interfaced to the interior and exterior of said aircraft using pressure sealing methodologies familiar to those in aircraft structures. Said Internally Mounted Refueling/Cable Carriage Assembly 34, housing substantially all the components of the populated Refueling Pod Assembly 33, without the requirement for a Pod Casing 23, or an aircraft Pylon 24, while still providing all the features and functional benefits of the preferred embodiment of the present invention.

Figure 4:
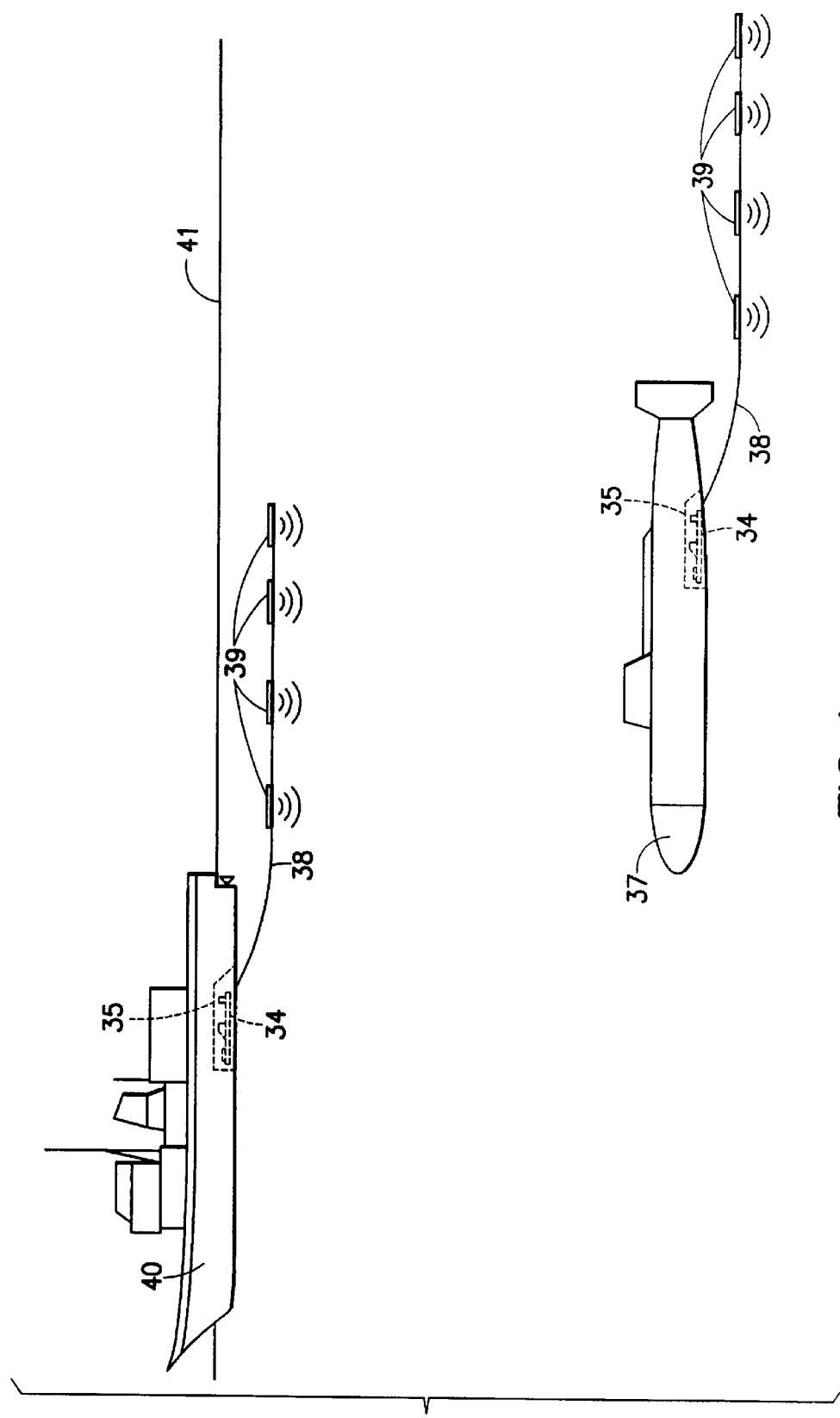
FIG. 4 Is a side view of a surface ship and sub surface submarine, engaged in anti submarine warfare activities each towing a sonar array with the tension restraint, and block and tackle system components of the present invention, mounted within watertight pressure housings.

Further, as depicted in FIGS. 3 and 4, the preferred embodiment of the present invention may also be adapted to a variety of other marine and aeronautical (owing missions wherein the Internally Mounted Refueling/Cable Carriage Assembly 34, is integrated within the fuselage of an aircraft or the hull of a Submarine 37, or a Ship 40, for towing Tow/Data/Power Cable 38 means equipped with Sonar Transducers 39, either on or beneath the Ocean 41.

While preferred embodiments have been shown and described, various substitutions and modifications may be made without departing from the spirit and scope of the invention. Accordingly it is to be understood that the present invention has been described by way of illustration and not limitation,

I claim:

1. An aerial refueling pod and constant tension line apparatus comprising a pulley system moveably attached to a refueling hose which in aerial refueling applications is shrouded at the trailing end by spring means, and said refueling hose providing an attachment interface for a first coupling means, and assembly means attached to a second coupling means, said spring means maintaining a substantially constant tension on said refueling hose upon its retraction.

2. An apparatus according to claim 1, wherein: said spring means includes a charged gas cylinder.

* * * * *